(12) United States Patent
Lee et al.

(10) Patent No.: US 12,715,307 B2
(45) Date of Patent: Aug. 25, 2026

(54) APPARATUS AND METHOD FOR CONTROL ELECTRIC VEHICLE

(71) Applicants: Hyundai Motor Company, Seoul (KR); Kia Corporation, Seoul (KR); HYUNDAI WIA CORPORATION, Changwon-si (KR)

(72) Inventors: Taewoo Lee, Suwon-Si (KR); Jeong Won Song, Hwaseong-Si (KR); Sung Keun Lim, Hwaseong-Si (KR); JunSeok Park, Seoul (KR); Jong Chan Lee, Hanam-Si (KR); Heon Kang, Hwaseong-Si (KR)

(73) Assignees: Hyundai Motor Company, Seoul (KR); Kia Corporation, Seoul (KR); HYUNDAI WIA CORPORATION, Changwon-si (KR)

( * ) Notice: Subject to any disclaimer, the term of this patent is extended or adjusted under 35 U.S.C. 154(b) by 187 days.

(21) Appl. No.: 18/386,501

(22) Filed: Nov. 2, 2023

(65) Prior Publication Data

US 2024/0198814 A1 Jun. 20, 2024

(30) Foreign Application Priority Data

Dec. 13, 2022 (KR) ........................ 10-2022-0173734

(51) Int. Cl.
*B60L 15/20* (2006.01)

(52) U.S. Cl.
CPC ....... *B60L 15/2018* (2013.01); *B60L 15/2054* (2013.01); *B60L 2240/507* (2013.01)

(58) Field of Classification Search
CPC ............. B60L 15/2018; B60L 15/2054; B60L 2240/507; B60L 15/2081; B60L 2240/12;
(Continued)

(56) References Cited

U.S. PATENT DOCUMENTS

2014/0235402 A1* 8/2014 Matsubara .......... B60L 15/2054 477/8
2016/0332627 A1* 11/2016 Yoon ................ B60W 30/18118
(Continued)

FOREIGN PATENT DOCUMENTS

KR 10-2019-0050239 A 5/2019
WO WO-2015037437 A1 * 3/2015 ............... B60K 6/48

OTHER PUBLICATIONS

"Owner's Manual Acura 2022 TLX" (Year: 2021).*
English translation of Kotsuji et al. (WO 2015037437) (Year: 2015).*

*Primary Examiner* — Kyle J Kingsland
(74) *Attorney, Agent, or Firm* — MORGAN, LEWIS & BOCKIUS LLP

(57) ABSTRACT

An apparatus for controlling an electric vehicle includes a drive motor configured to generate power required for driving of the vehicle, a twin clutch including a first clutch and a second clutch and configured to adjust power supplied from the drive motor to a first drive wheel and a second drive wheel of the vehicle through the first clutch and the second clutch, and a controller configured to, in response that a vehicle stop condition is satisfied, determine a slope of the vehicle by use of an acceleration of the vehicle and to adjust a clutch torque applied to the twin clutch depending on the slope of the vehicle.

16 Claims, 8 Drawing Sheets

(58) Field of Classification Search
CPC ............. B60L 2240/14; B60L 2240/46; B60L 2250/26; B60T 8/245; B60Y 2200/91
See application file for complete search history.

(56) References Cited

U.S. PATENT DOCUMENTS

| | | | | |
|---|---|---|---|---|
| 2019/0315433 | A1* | 10/2019 | Hasumi | B62M 6/50 |
| 2020/0169208 | A1* | 5/2020 | Koyama | B60L 3/04 |
| 2022/0363127 | A1* | 11/2022 | Okazaki | B60L 7/18 |
| 2024/0060540 | A1* | 2/2024 | Kim | F16D 25/10 |
| 2025/0058650 | A1* | 2/2025 | Milacic | B60K 23/08 |

* cited by examiner

Stopped state determined
Gear lever in P range
Vehicle turned OFF
Vehicle speed [kph]
Predetermined speed Brake cylinder pressure [bar]
Predetermined pressure APS
Preset amount Stopped state determined
Gear lever in P range
Vehicle turned OFF
Shift-stage
D range
P range Clutch torque [N*m]
Same level for left and right
Time [sec]

EMB state
Released
Engaged
Time [sec]

APPARATUS AND METHOD FOR CONTROL ELECTRIC VEHICLE

CROSS-REFERENCE TO RELATED APPLICATION

The present application claims priority to Korean Patent Application No. 10-2022-0173734 filed on Dec. 13, 2022, the entire contents of which is incorporated herein for all purposes by this reference.

BACKGROUND OF THE PRESENT DISCLOSURE

Field of the Present Disclosure

The present disclosure relates to an apparatus and method for controlling an electric vehicle. The present disclosure relates to an apparatus and method for controlling an electric vehicle capable of realizing a parking function using a twin clutch when the electric vehicle is stopped.

Description of Related Art

Recently, vehicles are provided with various parking/stopping control apparatuses for realizing a parking function for the driver's convenience. For example, an auto hold system and/or an electric parking brake (EPB) system are mounted on vehicles.

When the vehicle is stopped, the auto-hold system operates the brake to maintain the braking force, and when the vehicle starts again, the brake is released simultaneously with the operation of the accelerator pedal by the driver's manipulation. Accordingly, the driver does not need to continuously step on the brake pedal while the vehicle is stopped. In general, the auto hold function is activated when the driver depresses the brake pedal by a certain amount or more.

An electric parking brake (EPB) system operates an electric actuator through an electrical signal from an operating switch to operate a parking brake apparatus mounted on a wheel.

In the conventional vehicle stop control apparatus, when a predetermined time period elapses after the auto hold function is activated, the auto hold function is released and the electronic parking brake is operated to maintain the stopped state of the vehicle on a flat surface or on a slope.

The auto hold function applies braking force to the four wheels of the vehicle to keep the vehicle stationary, but the electronic parking brake system applies braking force only to the two wheels of the vehicle to keep the vehicle stationary, which may cause a problem in that the vehicle may start rolling downward on the slope at the time when the auto hold function is transitioned to the electronic parking braking.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for controlling an electric vehicle configured for preventing, when the vehicle is stopped on a slope, the vehicle from starting rolling downward on the slope.

An apparatus for controlling an electric vehicle includes a drive motor configured to generate power required for driving of the vehicle, a twin clutch including a first clutch and a second clutch and configured to adjust power supplied from the drive motor to a first drive wheel and a second drive wheel of the vehicle through the first clutch and the second clutch, and a controller configured to, in response that a vehicle stop condition is satisfied, determine a slope of the vehicle by use of an acceleration of the vehicle and to adjust a clutch torque applied to the twin clutch depending on the slope of the vehicle.

The vehicle stop condition may be satisfied when an opening of a brake pedal is above a preset amount, a pressure of a brake master cylinder is above a predetermined pressure, a vehicle speed is below a predetermined speed, or an opening of an accelerator pedal is below a preset amount.

The controller may be configured to determine the slope of the vehicle by reflecting the acceleration measured by an acceleration sensor into a map table stored in a memory in advance.

The controller may be further configured to increase the clutch torque applied to the twin clutch as the slope of the vehicle increases.

An apparatus for controlling an electric vehicle may further include an electromagnetic brake configured to fix the clutch torque applied to the twin clutch in response that the controller concludes that the vehicle is turned off.

A method for controlling an electric vehicle includes determining, by a controller, whether a vehicle stop condition is satisfied, determining, by the controller, a slope of the electric vehicle when the vehicle stop condition is satisfied, and applying, by the controller, a clutch torque to a twin clutch depending on the determined slope.

The vehicle stop condition may be satisfied when an opening of a brake pedal is above a preset amount, a pressure of a brake master cylinder is above a predetermined pressure, a vehicle speed is below a predetermined speed, or an opening of an accelerator pedal is below a preset amount.

In the determining of the slope of the electric vehicle, the slope of the electric vehicle may be determined by reflecting an acceleration measured by an acceleration sensor into a map table stored in a memory in advance.

The clutch torque applied to the twin clutch may be increased as the slope of the vehicle increases.

A method for controlling an electric vehicle may further include, after the applying of the clutch torque, determining whether the vehicle is turned off, and operating an electromagnetic brake to fix the clutch torque applied to the twin clutch in response that the controller concludes that the vehicle is turned off.

According to an apparatus and method for controlling an electric vehicle according to an exemplary embodiment of the present disclosure, the vehicle may be prevented from starting rolling downward on the slope while the vehicle is stopped, by applying braking force to wheels of the vehicle by applying a clutch torque for stopping the vehicle to the twin clutch.

Also, if the vehicle is turned off while applying the clutch torque to the twin clutch, the electromagnetic brake may be operated to maintain the clutch torque applied to the twin clutch. Accordingly, while the vehicle is stopped, the parking function of the vehicle may be maintained without supplying of separate power.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
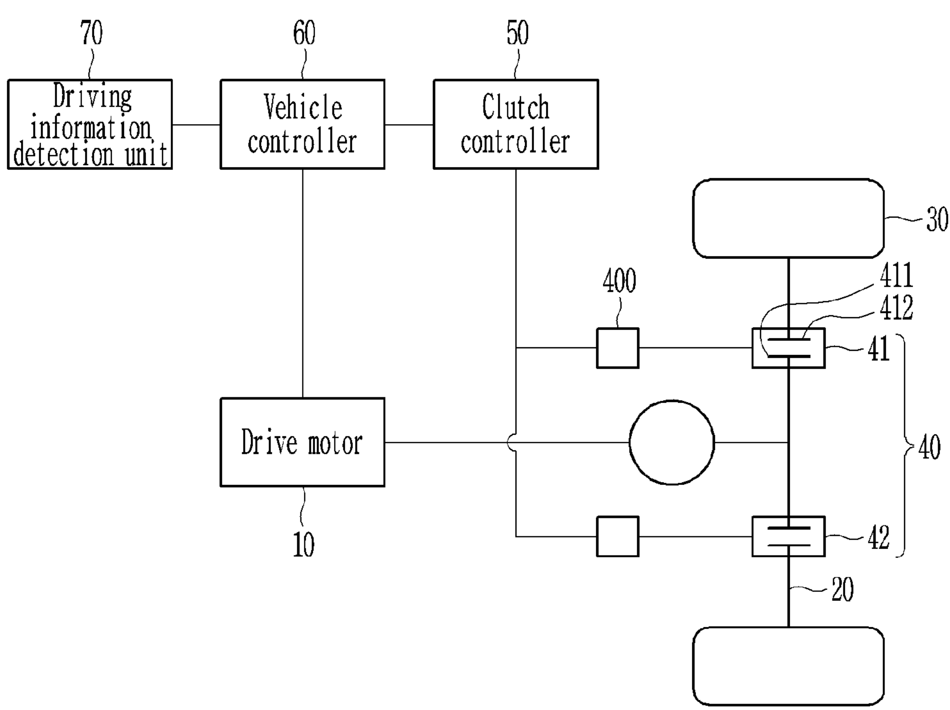
FIG. 1 is a schematic view showing a configuration of an apparatus for controlling an electric vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

The terminology used herein is for describing various exemplary embodiments only and is not intended to be limiting of the present disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

Additionally, it is understood that one or more of the below methods, or aspects thereof, may be executed by at least one controller. The term "controller" may refer to a hardware device that includes a memory and a processor. The memory is configured to store program instructions, and the processor is programmed to execute the program instructions to perform one or more processes which are described further below: The controller may be configured for controlling operation of units, modules, portions, devices, or the like, as described herein. Moreover, it is understood that the below methods may be executed by an apparatus including the controller in conjunction with one or more other components, as would be appreciated by a person of ordinary skill in the art.

Furthermore, the controller of the present disclosure may be embodied as non-transitory computer readable media including executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Terms including ordinal numbers such as first, second, and the like will be used only to describe various components, and are not interpreted as limiting these components.

As used herein, the singular forms "a", "an" and "the" are intended to include the plural forms as well, unless the context clearly indicates otherwise.

The terms are only used to differentiate one component from others.

It is to be understood that when one component is referred to as being "connected" or "coupled" to another component, it may be directly connected or coupled to another component or be connected or coupled to another component with the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Hereinafter, an apparatus for controlling an electric vehicle according to an exemplary embodiment of the present disclosure is described in detail with reference to the drawings.

FIG. 1 is a schematic view showing a configuration of an apparatus for controlling an electric vehicle according to an exemplary embodiment of the present disclosure. Furthermore, FIG. 2 is a block diagram showing a configuration of an apparatus for controlling an electric vehicle according to an exemplary embodiment of the present disclosure.

Figure 2:
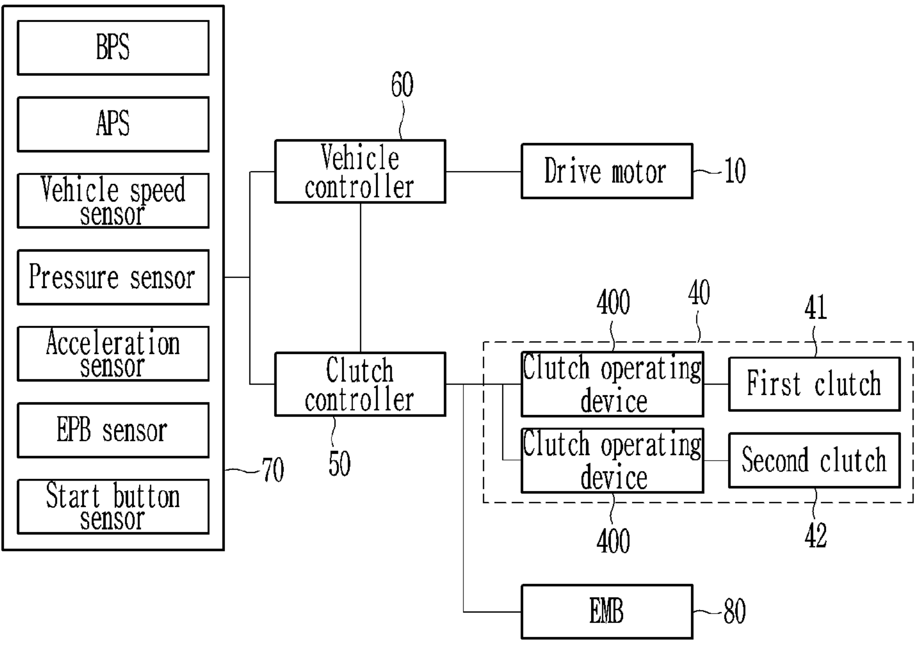
FIG. 2 is a block diagram showing a configuration of an apparatus for controlling an electric vehicle according to an exemplary embodiment of the present disclosure.

As shown in FIG. 1 and FIG. 2, an electric vehicle applied with an apparatus for controlling an electric vehicle according to various exemplary embodiments of the present disclosure may include a drive motor 10, a vehicle controller 60, a twin clutch 40, and a clutch controller 50.

The drive motor 10 is configured to generate driving torque required for driving of the vehicle from electrical energy, and the driving torque generated by the drive motor 10 is supplied to drive wheels (e.g., rear wheels) 30 of the vehicle or all wheel, to drive the vehicle. The driving motor 10 may be configured to generate electrical energy by operating as a generator, as needed (e.g., in a regenerative braking mode).

The twin clutch 40 is provided on the axle 20 mounted on the drive wheel 30 and includes a first clutch 41 and a second clutch 42 provided on both sides of the axle 20 around the propeller shaft. According to engagement and disengagement of the twin clutch 40, the driving torque (or a clutch torque) supplied from the drive motor 10 to the drive wheel 30 is supplied to or cut off from the drive wheels (e.g., rear wheels) 30, and a level of the driving torque (or, the clutch torque) supplied to the drive wheels is adjusted as needed.

The first clutch 41 and the second clutch 42 of the twin clutch 40 includes a clutch motor 410, a clutch operating device 400, a clutch plate 411, and a clutch disk 412, respectively.

Figure 3:
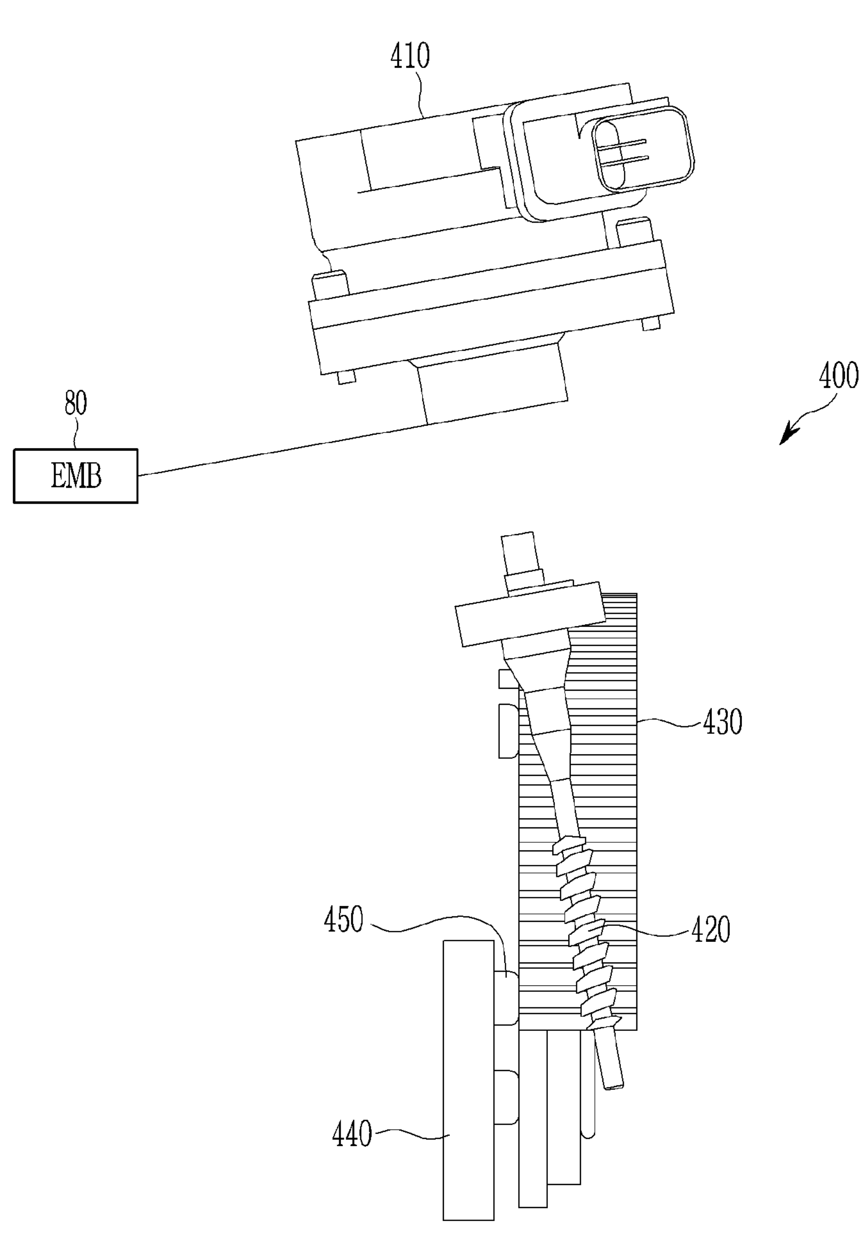
FIG. 3, FIG. 4 and to FIG. 5 are schematic views showing a configuration of a clutch according to an exemplary embodiment of the present disclosure.
Figure 4:
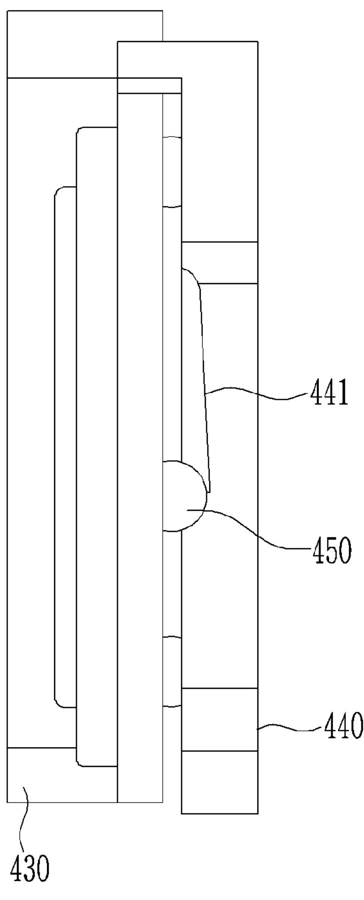
Figure 5:
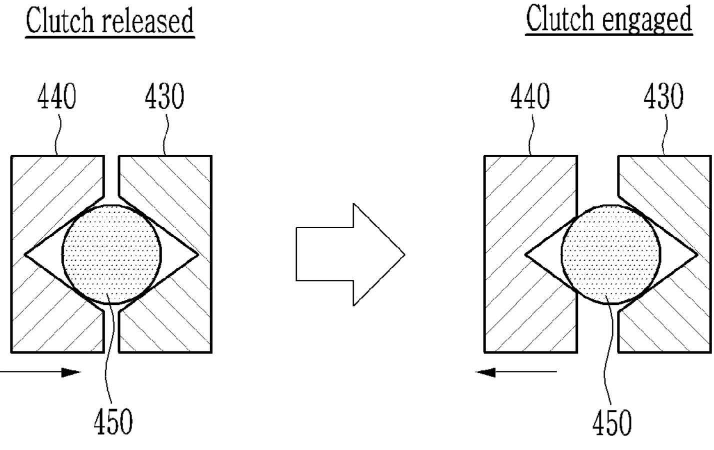

To referring to FIG. 3 FIG. 5, the clutch operating device 400 is located between the clutch motor 410 and the clutch plate 411, and the clutch operating device 400 may include a worm gear 420 connected to (e.g., gear-engaged with) a driveshaft of the clutch motor 410, a worm wheel 430 gear-engaged with the worm gear 420, and a cam plate 440 disposed to face the worm wheel 430. A cam path is formed in the worm wheel 430 and the cam plate 440, respectively, and the cam ball 450 is interposed in the cam path formed in the worm wheel 430 and the cam plate 440, respectively. The cam plate 440 is disposed to be contactable with the clutch plate 411.

When the clutch motor 410 is operated in a first direction, the worm gear 420 and the worm wheel 430 rotate in the first direction, and the cam ball 450, which is disposed on the cam path 441 formed in the worm wheel 430 and the cam plate 440, respectively, moves along the cam path 441, by which the cam plate 440 moves toward the clutch plate 411 and the cam plate 440 moves toward the clutch plate 411. Accordingly, as the clutch plate 411 and the clutch disk 412 are engaged, the first and/or the second clutches 41 and 42 are engaged.

At the present time, when a rotation amount (or, rotation angle) of the worm wheel 430 is adjusted by the clutch motor 410, by the cam ball 450 located between the worm wheel 430 and the cam plate 440, a moving amount of the cam plate 440 is adjusted and a pressurizing force of the clutch plate 411 by the cam plate 440 is adjusted. Accordingly, the pressurizing force (or, the clutch torque) applied between the clutch plate 411 and the clutch disk 412 may be adjusted.

To the contrary, when the clutch motor 410 is operated in a second direction, the worm gear 420 and the worm wheel 430 rotate in the second direction, and the cam ball 450, which is disposed on the cam path 441 formed in the worm wheel 430 and the cam plate 440, respectively, moves in an opposite direction along the cam path 441, by which the cam plate 440 moves away from the clutch plate 411 and the cam plate 440 moves away from the clutch plate 411. Accordingly, as the engagement of the clutch plate 411 and the clutch disk 412 is released, the engagement of the first and/or the second clutches 41 and 42 is released.

The torque (also referred to as the "clutch torque") applied to respective clutches may be controlled by independently adjusting the level of the pressurizing force applied to the first clutch 41 and the second clutch 42 included in the twin clutch 40. By independently controlling the respective torques applied to the clutches, the levels of the driving torques distributed to the respective drive wheels 30 through the clutches 41 and 42 are adjusted.

The vehicle controller 60 may be configured for controlling various parts required for driving of the vehicle including the drive motor 10 and may perform cooperative control with the clutch controller 50 as needed.

Depending on implementations, the clutch controller 50 and the vehicle controller 60 may be integrated or distributed (or to be separate). In an exemplary embodiment of the present disclosure, an example in which the clutch controller 50 and the vehicle controller 60 are implemented integrally will be described. In an exemplary embodiment of the present disclosure, the clutch controller 50 and the vehicle controller 60 may be collectively referred to a controller.

Each of the clutch controller 50 and the vehicle controller 60 may be provided as at least one processor operable by a predetermined program, and program instructions for performing each step in a method for controlling an electric vehicle according to an exemplary embodiment through at least one processor are store in a memory of the controller.

Meanwhile, an apparatus for controlling an electric vehicle according to an exemplary embodiment of the present disclosure includes the driving information detection unit 70 configured to detect driving information required for driving of the vehicle, and the driving information detected by the driving information detection unit 70 is transmitted to the clutch controller 50 and the vehicle controller 60.

The driving information may include a vehicle speed, an opening of a brake pedal, an opening an accelerator pedal, a pressure of a brake master cylinder, a slope of the vehicle, an operation state of an electronic parking brake (EPB), and a started state of the vehicle.

For such a purpose, the driving information detection unit 70 may include a brake pedal sensor (BPS) configured to detect the opening of the brake pedal, an accelerator pedal sensor (APS) configured to detect the opening of the accelerator pedal, a vehicle speed sensor configured to detect the vehicle speed, a pressure sensor configured to detect the pressure of the brake master cylinder, an acceleration sensor configured to detect the slope of the vehicle, a brake button sensor (EPB sensor) configured to detect an operation state of the electronic parking brake, and a start button sensor configured to detect an ON/OFF state of a start button.

The opening of the accelerator pedal detected by the accelerator pedal sensor may be in a range of 0% (the driver does not press the accelerator pedal) to 100% (the driver has fully pressed the accelerator pedal), and the opening of the brake pedal detected by the brake pedal sensor may be in a range of 0% (the driver does not press the brake pedal) to 100% (the driver has fully pressed the brake pedal).

The driving information detected by the driving information detection unit 70 is transmitted to the controller.

Meanwhile, the electric vehicle according to present disclosure may further include an electromagnetic brake (EMB) configured to fix (or, maintain) the clutch torque applied to the twin clutch when the vehicle is turned off while the vehicle is stopped. The electromagnetic brake may fix (or, maintaining) the clutch torque between the clutch plate 411 and the clutch disk 412 by fixing a position of the clutch motor 410 (or, position of the driveshaft of the clutch motor) to maintain a gap between the cam plate 440 and the clutch plate 411.

Hereinafter, a method for controlling an electric vehicle according to an exemplary embodiment of the present disclosure will be described in detail with reference to the accompanying drawings.

Figure 6:
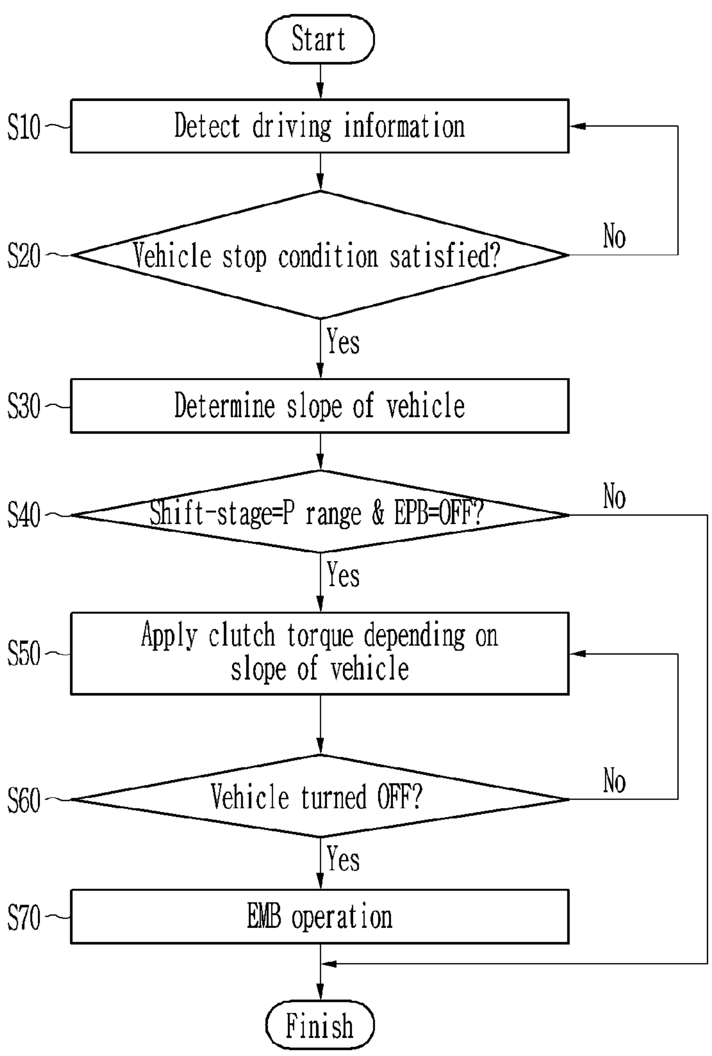
FIG. 6 is a flowchart showing a method for controlling an electric vehicle according to an exemplary embodiment
Figures 7A, 7B, 7C:
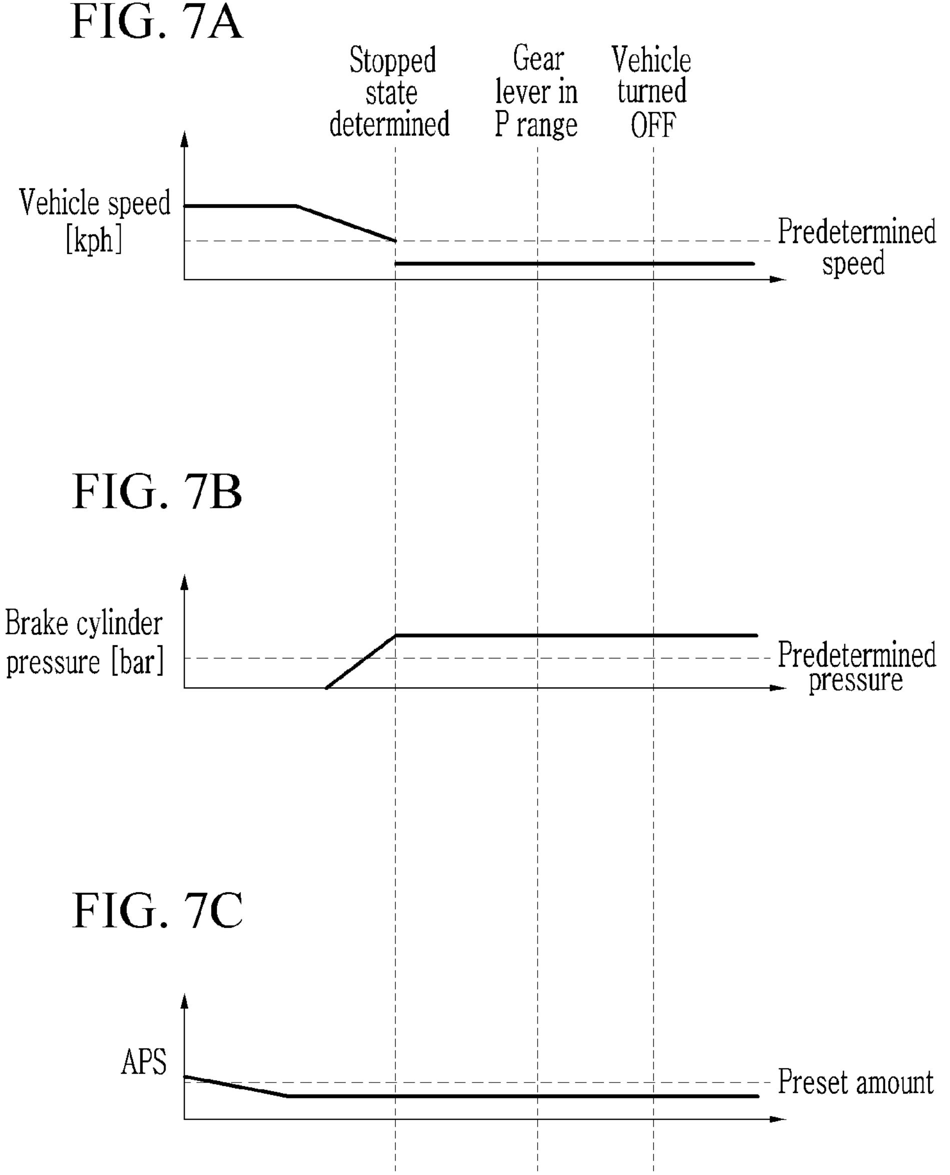
FIG. 7 shows graphs for illustrating an operation of an electric vehicle according to an exemplary embodiment of the present disclosure.

FIG. 6 is a flowchart showing a method for controlling an electric vehicle according to an exemplary embodiment Furthermore, FIG. 7 shows graphs for illustrating an operation of an electric vehicle according to an exemplary embodiment of the present disclosure.

Referring to FIG. 6 and FIG. 7, at step S10, the driving information detection unit 70 detects the driving information required for driving of the vehicle, and the detected driving information is transmitted to the vehicle controller 60 and the clutch controller 50. Here, the driving information detected by the driving information detection unit 70 is a same as described above, and is not described in further detail.

At step S20, the vehicle controller 60 is configured to determine, whether a vehicle stop condition is satisfied, based on the driving information transmitted from the driving information detection unit 70. The vehicle stop condition may be satisfied when an opening of the brake pedal is above a preset amount, a pressure of the brake master cylinder is above a predetermined pressure, the vehicle speed is below a predetermined speed, or an opening of the accelerator pedal is below a preset amount (refer to FIG. 7A, FIG. 7B, and FIG. 7C). That is, the controller may be configured to determine that vehicle is in a stopped state when the vehicle stop condition is satisfied.

At step S30, when the vehicle stop condition is satisfied, the vehicle controller 60 may be configured to determine the slope of the vehicle based on an acceleration value of the vehicle detected from the acceleration sensor. The slope of the vehicle is stored in the memory of the vehicle controller 60 in a form of a map table corresponding to the acceleration of the vehicle detected by the acceleration sensor, the vehicle controller 60 may be configured to determine the slope (i.e., inclination or tilt) of the vehicle by mapping the acceleration value detected by the acceleration sensor to the map table stored in the memory.

Figures 7D, 7E, 7F:
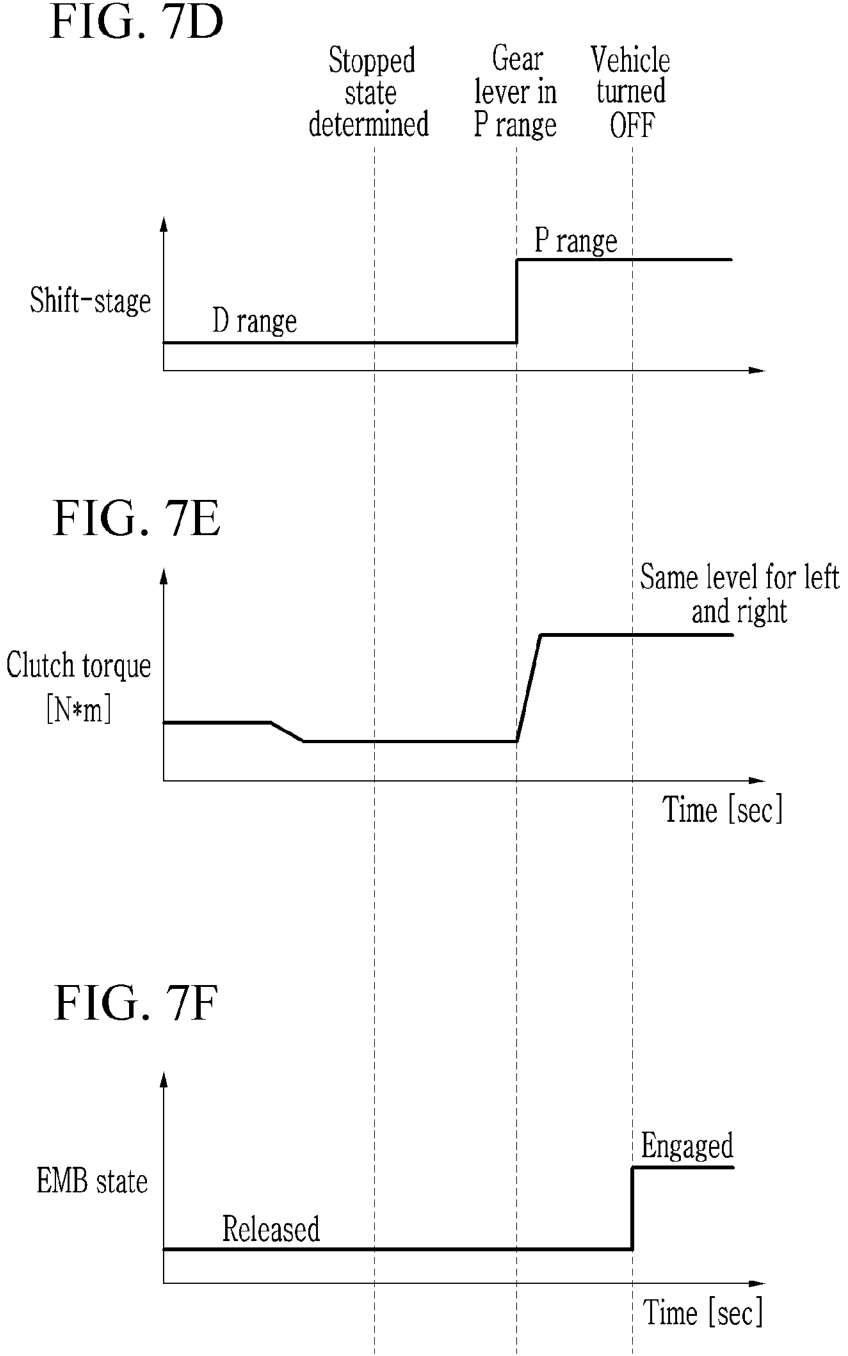

At step S40, the vehicle controller 60 is configured to determine whether a shift-range of a transmission is in a P range (i.e., parking range) and the operation state of the electronic parking brake is an OFF-state (refer to FIG. 7D).

When the shift-range of the transmission is not the P range (e.g., when the shift-range is the D range), it may be determined that the driver has no intention to stop the vehicle, and thus the clutch torque for stopping the vehicle is not applied to the twin clutch. Furthermore, when the electronic parking brake is an ON-state, a parking brake function separate from the present disclosure is performed by the electronic parking brake, and therefore, the clutch torque for stopping the vehicle is not apply to the twin clutch.

When it is determined at the step of S40 that the shift-range of the transmission is the P range (parking range) and the operation state of the electronic parking brake is the Off-state, the clutch controller 50 applies the clutch torque for stopping the vehicle to the twin clutch depending on the slope of the vehicle, at step S50. At the instant time, the clutch controller 50 may increase the clutch torque applied to the twin clutch as the slope of the vehicle increases. Furthermore, the clutch torque applied to the first clutch and the second clutch of the twin clutch may be a same (refer to FIG. 7E).

Accordingly, a torque of a predetermined level is applied to the drive wheel through the twin clutch when the clutch torque is applied to the twin clutch while the vehicle is stopped, and therefore, even if the vehicle is parked or stopped on a sloped place, the vehicle may be prevented from rolling along the sloped surface. Furthermore, the clutch torque may be increased as the slope of the road on which the vehicle is parked or stopped increases, and therefore, the vehicle may be ensured to be prevented from rolling downward due to the slope.

At step S60, the clutch controller 50 is configured to determine whether the vehicle is turned off.

When the vehicle is turned off, at step S70, to constantly maintain (or fix) the clutch torque of the twin clutch, the clutch controller 50 operates the electromagnetic brake so that the electromagnetic brake may fix the position of the clutch motor 410 of the twin clutch (refer to FIG. 7F).

According to an exemplary embodiment of the present disclosure as described above, when the vehicle is stopped and the vehicle is turned off, braking force may be applied to the wheels of the vehicle by applying the clutch torque to the twin clutch depending on the slope of the vehicle, and accordingly, the vehicle may be prevented from rolling downward when the vehicle is stopped on a slope.

Furthermore, when the vehicle is turned off, the clutch torque of the twin clutch may be constantly maintained by the electromagnetic brake, and therefore, the braking force to the wheels of the vehicle may be maintained without requiring additional supply of power, being configured for replacing the function of the electronic parking brake.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:

a drive motor configured to generate power required for driving of the vehicle;

a twin clutch including a first clutch and a second clutch and configured to independently adjust power supplied from the drive motor to each of a first drive wheel and a second drive wheel of the vehicle through the first clutch and the second clutch; and a controller configured to, in response that a vehicle stop condition is satisfied, determine a slope of the vehicle by use of an acceleration of the vehicle and to adjust a clutch torque applied to the twin clutch depending on the determined slope of the vehicle; and an electromagnetic brake configured to fix the clutch torque applied to the twin clutch in response that the controller concludes that the vehicle is turned off, wherein the electromagnetic brake fix the clutch torque by fixing a position of a clutch motor.

2. The apparatus of claim 1, wherein the vehicle stop condition is satisfied when an opening of a brake pedal is above a preset amount, a pressure of a brake master cylinder is above a predetermined pressure, a vehicle speed is below a predetermined speed, or an opening of an accelerator pedal is below a preset amount.

3. The apparatus of claim 1, wherein the controller is configured to determine the slope of the vehicle by reflecting the acceleration measured by an acceleration sensor into a map table stored in a memory in advance.

4. The apparatus of claim 1, wherein the controller is further configured to determine a driver's intention of stopping the vehicle upon determining the slope of the vehicle, and wherein when the controller concludes that the driver intends to stop the vehicle, the controller is configured to adjust the clutch torque applied to the twin clutch depending on the slope of the vehicle.

5. The apparatus of claim 4, wherein the controller is further configured to conclude that the driver intends to stop the vehicle, upon concluding that a shift-range of a transmission in the vehicle is in a parking range and an operation state of an electronic parking brake in the vehicle is an OFF-state.

6. The apparatus of claim 5, wherein the controller is further configured to increase the clutch torque applied to the twin clutch as the slope of the vehicle increases.

7. The apparatus of claim 1, wherein the controller is further configured to increase the clutch torque applied to the twin clutch as the slope of the vehicle increases.

8. The apparatus of claim 1, further including the electromagnetic brake configured to fix the clutch torque applied to the twin clutch in response that the controller concludes that the vehicle is turned off.

9. A method for controlling a vehicle, the method comprising:

determining, by a controller, whether a vehicle stop condition is satisfied;

determining, by the controller, a slope of the vehicle in response that the vehicle stop condition is satisfied; and independently applying, by the controller, a clutch torque to each clutch of a twin clutch depending on the determined slope; and after the applying of the clutch torque:

determining whether the vehicle is turned off; and operating an electromagnetic brake to fix the clutch torque applied to the twin clutch in response that the controller concludes that the vehicle is turned off, wherein the electromagnetic brake fix the clutch torque by fixing a position of a clutch motor.

10. The method of claim 9, wherein the vehicle stop condition is satisfied when an opening of a brake pedal is above a preset amount, a pressure of a brake master cylinder is above a predetermined pressure, a vehicle speed is below a predetermined speed, or an opening of an accelerator pedal is below a preset amount.

11. The method of claim 9, wherein, in the determining of the slope of the vehicle, the slope of the vehicle is determined by reflecting an acceleration measured by an acceleration sensor into a map table stored in a memory in advance.

12. The method of claim 9, wherein the controller is further configured to determine a driver's intention of stopping the vehicle upon determining the slope of the vehicle, and wherein when the controller concludes that the driver intends to stop the vehicle, the controller is configured to adjust the clutch torque applied to the twin clutch depending on the slope of the vehicle.

13. The method of claim 12, wherein the controller is further configured to conclude that the driver intends to stop the vehicle, upon concluding that a shift-range of a transmission in the vehicle is in a parking range and an operation state of an electronic parking brake in the vehicle is an OFF-state.

14. The method of claim 13, wherein the clutch torque applied to the twin clutch is increased as the slope of the vehicle increases.

15. The method of claim 14, further including, after the applying of the clutch torque:

determining whether the vehicle is turned off; and operating the electromagnetic brake to fix the clutch torque applied to the twin clutch in response that the controller concludes that the vehicle is turned off.

16. The method of claim 9, wherein the clutch torque applied to the twin clutch is increased as the slope of the vehicle increases.

* * * * *